Nov. 21, 1961  G. H. BINGHAM, JR., ET AL  3,009,204
APPARATUS FOR USE IN MAKING FOOTWEAR HAVING MOLDED OUTERSOLES
Filed July 21, 1959  4 Sheets-Sheet 1

INVENTORS
George H. Bingham, Jr.
Otto Y. Olsson
by Roberts Cushman Grover
Attys

Nov. 21, 1961    G. H. BINGHAM, JR., ET AL    3,009,204
APPARATUS FOR USE IN MAKING FOOTWEAR HAVING MOLDED OUTERSOLES
Filed July 21, 1959    4 Sheets-Sheet 2
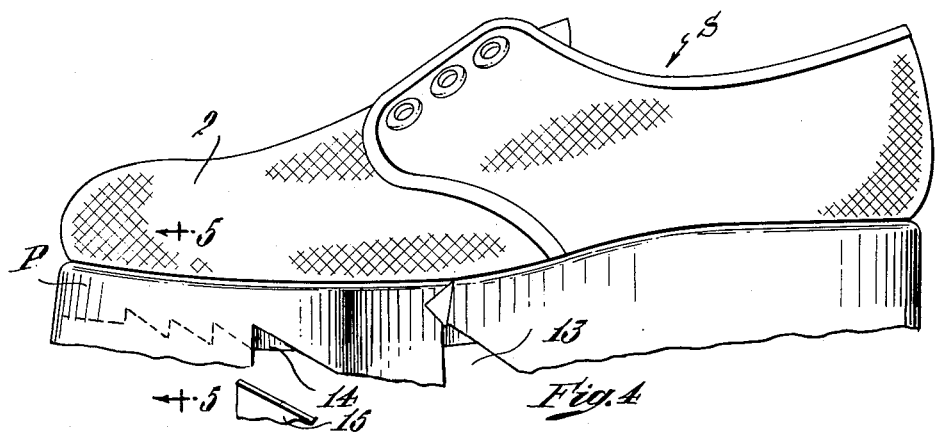
Fig. 4
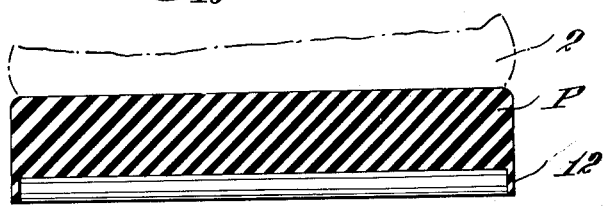
Fig. 5
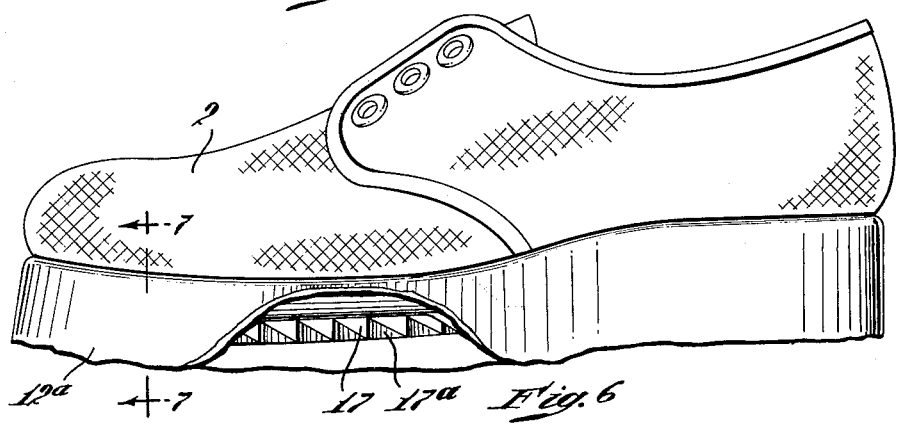
Fig. 6
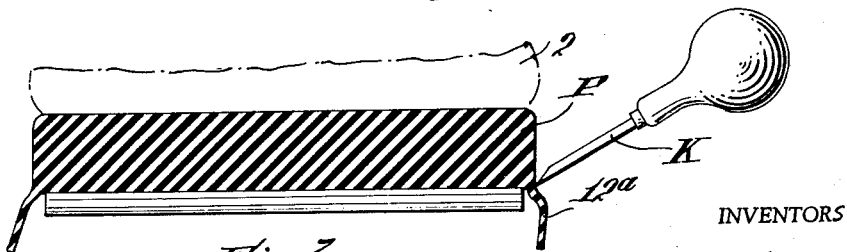
Fig. 7
INVENTORS
George H. Bingham, Jr.
Otto Y. Olsson
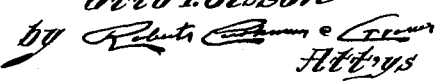
Att'ys Nov. 21, 1961  G. H. BINGHAM, JR., ET AL  3,009,204
APPARATUS FOR USE IN MAKING FOOTWEAR HAVING MOLDED OUTSOLES
Filed July 21, 1959  4 Sheets-Sheet 3

INVENTORS
George H. Bingham, Jr.
Otto Y. Olsson
by Roberts Cushman
Att'ys

United States Patent Office 3,009,204
Patented Nov. 21, 1961

3,009,204
APPARATUS FOR USE IN MAKING FOOTWEAR HAVING MOLDED OUTERSOLES

George Hutchins Bingham, Jr., Westminster, and Otto Y. Olsson, Taneytown, Md., assignors to Cambridge Rubber Company, Taneytown, Md., a corporation of Maryland
Filed July 21, 1959, Ser. No. 828,527
3 Claims. (Cl. 18—34)

This invention relates to the manufacture of shoes having outersoles of molded material, for example, a rubber compound, and more particularly, to apparatus for use in making shoe soles having transverse saw-tooth-like ribs, such soles being sometimes termed "ripple" soles, although in its broader aspects the invention is useful in the manufacture of shoes whose soles do not have transversely-extending ribs.

Molded ribbed soles have customarily been formed and bonded to shoe uppers by the use of a machine having means for supporting a sole or bottom mold, a multipart ring or side mold, and a heated last over which the shoe upper is drawn and by means of which pressure may be applied whereby to bond a sole blank resting upon the bottom mold, to the undersurface of the insole element of the lasted upper while concomitantly molding the blank to the desired shape. For use in making the ribbed soles, the upper surface of the bottom or sole mold member is provided with alternating transversely-extending ribs and channels which are like, but in reverse, the ribs and intervening channels to be formed in the sole. In conventional practice, the bottom mold, whose upper surface is shaped to have the transversely-extending ribs and channels, is assembled with the ring mold (generally in two complementary parts); a sole blank is placed on the upper surface of the sole mold; and the lasted upper is placed, bottom down, on the sole blank and pressed downwardly against the blank while the parts of the ring mold are forced together and heat is applied to the blank by the heated last. In this manner, the sole blank, confined between the last and the mold parts, is conformed to the shape of the mold cavity and at the same time is adhesively bonded to the insole and to the lower margin of the upper.

However, it is not practicable to make molds which for every size and style of shoe are so accurately shaped and finished that when assembled with the lasted upper a leak-tight joint is formed between the sole mold and ring mold. Thus excess flowable sole material is exuded between the ring mold and the peripheral surface of the sole mold during the molding and bonding operation. This excess material forms a downwardly directed thin lip, ribbon or curtain, and as the sole material is cured in the mold, this lip or ribbon is integrated with the ends of the transversely-extending ribs which are formed by the sole mold and closes the ends of the transversely-extending channels in the mold. According to prior conventional methods in making shoes of this type, those portions of the lip or curtain which extend across and which close the ends of the sole channels and which are integrally joined to the ribs, are snipped out individually by the use of scissors, an operation which is slow and laborious and which cannot be relied upon to provide a neat and finished appearance.

An object of this invention is to provide apparatus for use in making molded soles, particularly those of the transversely ribbed type, such that the ends of the sole channels will not be closed by the material which is exuded during the bonding operation, and to provide apparatus for use in making such shoes such that the lip or curtain formed by the exuded material can be quickly and conveniently trimmed away, leaving the ribs with smoothly finished end faces and the ends of the channels of uniform shape and size.

A further object is to provide apparatus for use in making a shoe having a molded sole, whether ribbed or not, wherein the lateral margin of the sole may be provided with a distinctive appearance or configuration, including, for example, a welt effect.

In the attainment of the above objects, the bottom or sole mold, having transversely-extending triangular ribs with intervening triangular channels at its upper face, is, in accordance with the present invention, provided with a marginal rim or barrier which closes the ends of the channels, the outer surface of this rim or barrier being flush with the peripheral surface of the lower portion of the sole mold proper, and its upper edge, in the preferred embodiment, being flush with the upper edge of each rib at the respective points of intersection. This novel sole mold, including the rim or barrier, is peripherally contoured throughout its entire depth, including its rim or barrier, to be disposed within the cavity of the ring mold. This improved sole mold is used in the same way as the conventional sole mold as above described in forming and bonding an outersole to a lasted upper, but because of the presence of the rim or barrier which closes the ends of the channels, the excess material which is exuded during the bonding operation flows down the outer side of the rim or barrier and is completely separated from the ends of the ribs in the molded sole. Since the upper edge of the rim or barrier is flush with the upper or apex edge of each respective channel in the molded sole, the curtain or lip of exuded material is united to the main part of the sole only above the upper edges of the channels in the sole and may be trimmed off by making a single continuous incision extending about the entire periphery of the sole, leaving the upper part of the sole projecting slightly beyond the end face of the ribs.

In another embodiment of the invention the mold rim or barrier is of a height and contour such that the line along which the above noted lip or curtain of exuded material is trimmed, whether the sole be ribbed or not, results in the formation of a stepped peripheral edge on the sole which, if of proper thickness relatively to the entire thickness of the sole, may impart a welt effect. Moreover, by providing a rim or barrier whose inner surface is patterned or textured, the ends of the ribs or the peripheral surface of the finished sole as a whole, may be given a pleasing ornamental appearance.

Other objects and advantages of the present invention will be made manifest in the following more detailed description and by reference to the drawings in which:

FIG. 4 is a side elevation of a shoe such as is produced by prior conventional methods and apparatus, showing the lip or curtain of exuded sole material partially trimmed away;

FIG. 5 is a section, to larger scale, on the line 5—5 of FIG. 4;

FIG. 6 is a side elevation of a shoe produced by the method and apparatus herein described, but before the lip or curtain of exuded material has been trimmed away, showing the lip or curtain material partially broken away to expose the ends of the ribs and channels;

FIG. 7 is a section on the line 7—7 of FIG. 6, illustrating one way of removing the lip or curtain of exuded material from the cured sole;

Figure 11:
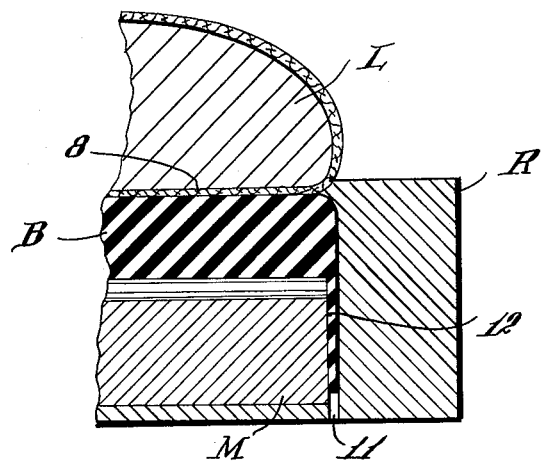
FIG. 11 is a fragmentary section in the same plane as FIG. 5, but to larger scale, showing the ribbed sole as it is being formed and bonded to the lasted shoe by the use of a conventional mold.

Referring to the drawings, and particularly to FIG. 11, which illustrates a conventional prior method and apparatus, the shoe upper 2 is shown as of sock type having an insole portion 8 integral with the upper, proper, or united therewith by stitches. In accordance with the usual prior procedure, this upper will have been drawn over a last L which may be a heated last, such as commonly used in machines of the so-called "Desma" type. Since, as above noted, the parts of the ring mold R, for various reasons, do not usually fit closely against the periphery of the sole mold, excess flowable sole material, comprised in the sole blank B, as shown in FIG. 11, has been squeezed downwardly through the crevice 11 between the inner surface of the ring mold R and the outer peripheral surface of the sole mold M to form a downwardly depending lip or curtain 12 integrally joined at its upper part to the main portion P (FIG. 4) of the sole. This lip or curtain is also integrally joined with the ends of the ribs 13 (FIG. 4), formed in the sole by the sole mold, and since this lip or curtain extends from rib to rib it closes the ends of the channels 14 molded into the sole material. As shown in FIGS. 4 and 5, when the shoe S, formed by the above-described method, has been cured and removed from the molds, those portions 15 (FIG. 4), at least, of the lip or curtain 12 of exuded material which close the several channels in the molded sole must be trimmed away. This trimming operation, as above noted, has usually been carried out by snipping away the portions 15, one by one, by the use of scissors. This is a slow, tedious operation which is disliked by the shoe workers and which leaves the ends of the ribs and channels with an unfinished appearance, and greatly increases the cost of manufacturing this type of sole.

In FIGS. 8, 9, 10 and 10a there is illustrated the novel sole mold according to the present invention, by means of which a ribbed sole can be made much more easily, perfectly and economically than has previously been possible. This improved sole mold $M^1$ comprises a central or main block 16 (FIG. 9) of generally conventional peripheral contour, and with alternating transversely-extending ribs and channels at its upper side. Preferably, but not necessarily, the series of ribs 17 and the intervening channels 17a (FIG. 10a) at the forward portion of the mold are arcuate transversely, their upper edges being curved (in plan view), so that when one looks forwardly, they are concave toward the observer. The forward faces 17x of these ribs are vertical. On the other hand, the series of ribs 18 (FIG. 10) which are located rearwardly of the heel breast line have upper edges which, looking rearwardly, are concave toward the observer and have vertical rear faces. The rear faces of the ribs 17 are inclined downwardly and rearwardly and the forward faces of the ribs 18 are inclined downwardly and forwardly. As here illustrated, the vertical faces of the ribs of both series intersect their inclined faces at an angle in the order of 60°.

Figure 9:
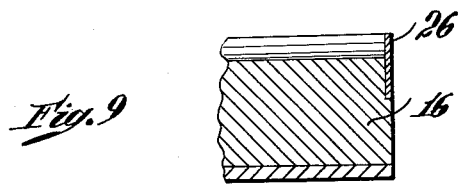
FIG. 9 is a partial section on the line 9—9 of FIG. 10.
Figure 10:
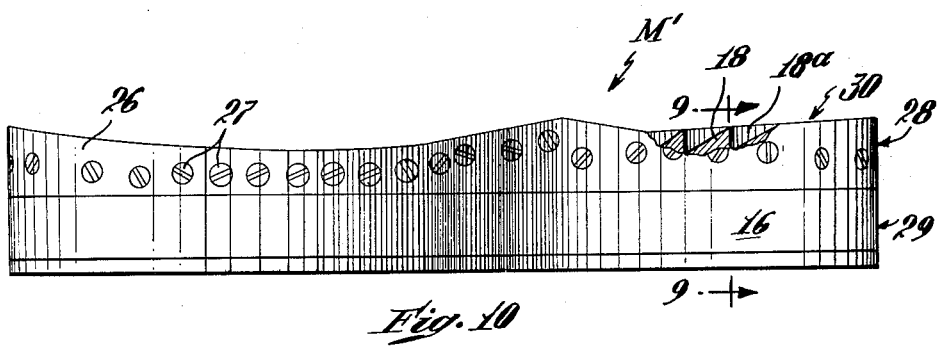
FIG. 10 is a side elevation of the mold of FIG. 8 with a portion broken away.
Figure 10A:
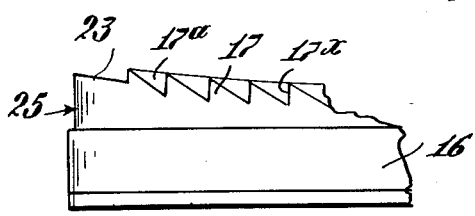
FIG. 10a is a fragmentary side elevation of the mold of FIG. 10 but omitting the rim or barrier.

The shank portion of the mold is not ribbed and, as here shown at 19, is flat. At approximately the location of the heel breast line 20, the upper surface of the mold slopes downwardly and rearwardly at 21 to intersect a flat face 22 at the level of the apex lines of the channels 18a between the ribs 18. Preferably, the tips 23 and 24, respectively, of the toe and heel portions of the mold are unribbed, flat and horizontal, and below the level of the upper edges of the ribs. The upper portion of the peripheral surface of the block 16 is rabbeted as at 25 (FIG. 10a) to accommodate an upstanding rim or barrier 26 (FIG. 9). This rim or barrier is of thin sheet metal, for example, steel of the order of $\frac{1}{32}$ of an inch in thickness—attached to the block 16, for example by means of screws 27—the outer surface 28 of this rim or barrier being flush with the peripheral surface 29 of the lower portion of the block 16. As here illustrated, the upper edge 30 of this rim or barrier is flush with the upper edge of each respective rib at its point of intersection with the latter, thereby closing the ends of each of the channels 17a and 18a between the respective ribs. The upper edge 30 of the rim or barrier 28 is preferably contoured approximately as shown in side elevation in FIG. 10.

Figure 12:
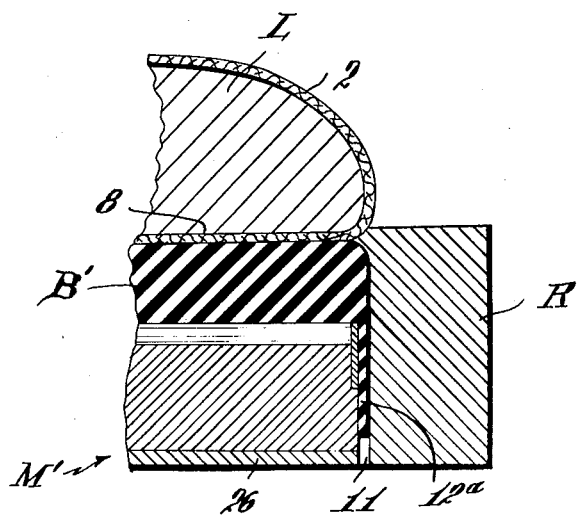
FIG. 12 is a fragmentary section similar to FIG. 7, showing the ribbed sole while being formed and bonded to the lasted shoe by the use of the sole mold of the present invention.

FIG. 12 illustrates the process of bonding a shoe upper to an outersole, while molding the latter to form the ribs, by the use of the novel sole mold above described. The upper 2 with its insole portion 8 has been drawn over the conventional heated last L; the bottom mold $M^1$ of the present invention has been assembled with the conventional ring mold R; and a sole blank $R^1$ of rubber or other moldable material has been placed on the upper surface of the bottom mold $M^1$. The lasted upper 2, bottom down, has been placed on the sole blank $B^1$ and heat and pressure have been applied. As a result, the lower side of the sole blank has been conformed to the upper surface of the bottom mold to form the ribs 77 and 88 (FIG. 3) with intervening channels 77a and 88a and the insole portion of the upper has been bonded to the outersole. Excess flowable material from the sole blank $B^1$ (FIG. 12) has exuded between the inner surface of the ring mold R and the outer peripheral surface of the bottom mold $M^1$, thereby forming the downwardly depending lip or curtain 12a. However, in this instance, the lip or curtain 12a is only joined to the sole above the upper edge 38 of the rim or barrier 26, being separated from the ends of the transverse ribs of the molded sole by the barrier.

As shown in FIGS. 6 and 7, when the shoe sole has been fully cured and the lasted shoe has been removed from the mold, the lip or curtain 12a which is joined to the main part P of the sole only above the level of the upper or apex edges of the channels 17a in the molded sole, and which is not joined to the ends of the ribs 88, can be trimmed from the sole by the use of a heated knife K or other appropriate instrumentality in one continuous incision extending along the line 31 (FIG. 1) defined by the upper edge 30 of the sole mold rim or barrier 26, thus greatly reducing the time necessary to clear the exuded material from the ends of the channels in the molded sole.

Figure 1:
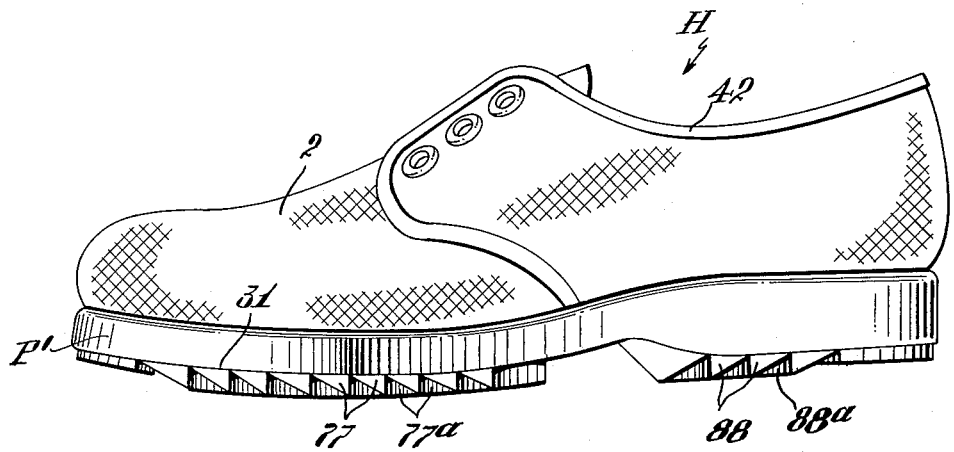
FIG. 1 is a side elevation of a shoe, having a ribbed sole, made by the method and apparatus herein described.
Figure 2:
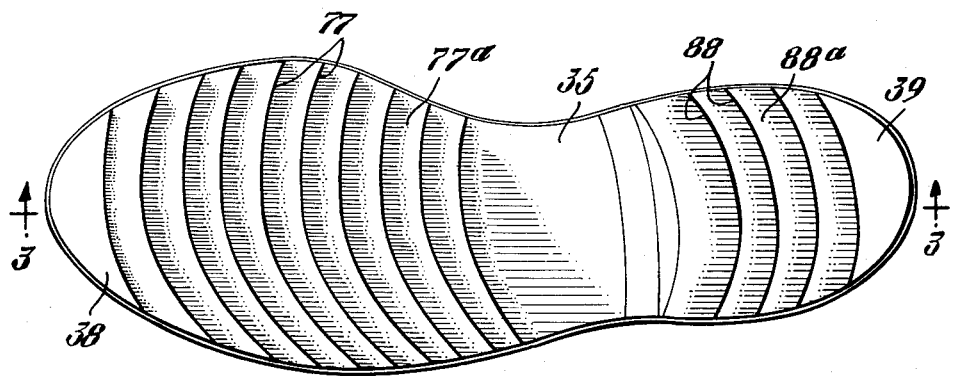
FIG. 2 is a bottom view of the shoe of FIG. 1.
Figure 3:
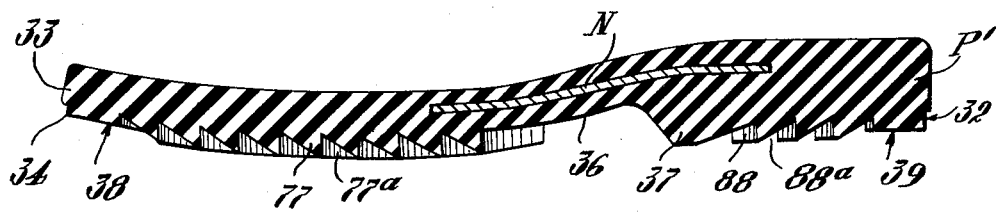
FIG. 3 is a section on the line 3—3 of FIG. 2.
Figure 8:
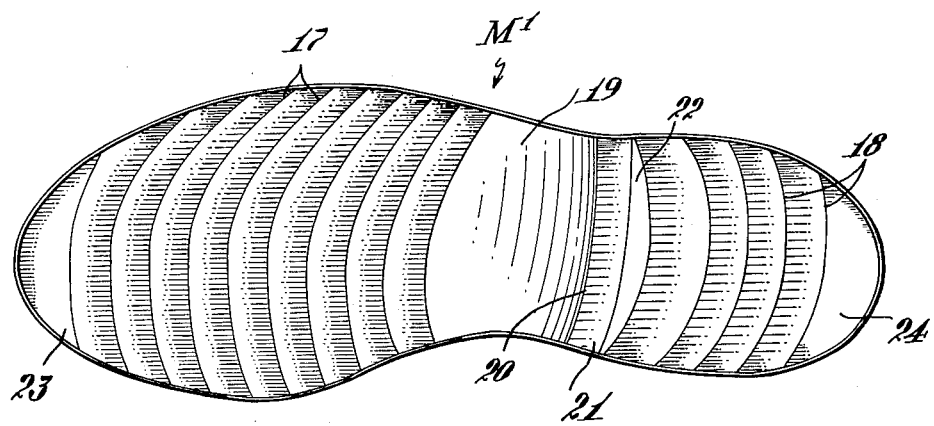
FIG. 8 is a plan view of a sole mold useful in the practice of the present invention.

As illustrated in FIGS. 1, 2 and 3, the shoe H made by the use of the use of the above-described apparatus will have a molded ribbed sole $P^1$ which is bonded, for example, by vulcanization to the shoe upper 2. The peripheral edge of the sole will be stepped, as shown at 32 (FIG. 3), after removal of the lip or curtain 12a, because of the thickness of the rim or barrier 26, so that the outer edge of the sole has distinctive upper and lower portions 33 and 34 respectively, the part 33 projecting slightly beyond the outer, end faces of the ribs. The contour and location of the line 31 (FIG. 1) between these upper and lower portions of the sole edge is determined by the height and contour of the top edge 30 of the sole mold rim or barrier 26 and, therefore, making the barrier of varying or different heights and/or by properly designing this edge, different effects may be produced. For example, if the barrier be of such height that its upper edge is but a short distance below the upper surface of the sole proper, the resultant upper portion 33 of the peripheral edge of the sole will be so thin, vertically, as to suggest a welt. Moreover, if the sole blank, before molding, has a thin bond of material of a color different from the body of the blank, this distinctively colored material will be that which forms the lip or curtain 12a, and when this is trimmed away the exposed ends of the ribs will be of a color different from that of the upper part of the sole.

Since the shank portion 35 of the molded sole is not ribbed, it may have a conventional arch, as shown at 36 (FIG. 3). Just to the rear of this arch, approximately at the heel breast region and between the part 35 and the first rib 88 to the rear thereof, the molded sole has a thick portion 37 (FIG. 3), resultant from the shapes of the surfaces 20, 21 and 22 of the mold, which provides a good anchorage for the rear end of a steel shank piece N (FIG. 3) which may be introduced during molding, if desired. The unribbed toe and heel portions 38 and 39 of the molded sole are adapted to receive metallic or other wear plates (not shown), if desired.

Since the inner surface of the rim or barrier defines the ends of the ribs, it is possible, if desired, by providing its inner surface with an ornamental design or configuration to impart such a design to the ends of the ribs. It should further be recognized that although the rim or barrier above-described is of particular utility in the manufacture of a ribbed sole, it may likewise be useful in making a sole which, although it may not have alternating ribs and channels, may have relatively depressed and elevated areas and where the depressed areas, or at least some of them, extend to the margin of the sole. Under those circumstances, the provision of a barrier, such as above described, will prevent the exuded material from closing the ends of these depressed areas in such a way that it is necessary to clear them individually. Furthermore, it is contemplated that even though the upper surface of the mold may be substantially smooth, nevertheless, the provision of such a rim, as that above described, having its edges above the normal level of the upper surface of the mold, may be useful in providing a sole whose edge has the stepped appearance above described, or such other peripheral contour or surface texture as may result from a suitable shaping of the inner surface of the rim.

While for convenience herein, reference has been made to the "upper" surface of the sole mold and to the "upper" edge of the rim, it should be understood that it is not thereby intended to limit use of the mold to any particular position.

Although one desirable embodiment of the invention has been herein illustrated and described, it is to be understood that all modifications and equivalents which fall within the scope of the appended claims are to be regarded as within the purview of the invention.

We claim:
1. A bottom mold for use in apparatus for so molding an outer sole from an initial plastic blank that the tread surface of the completed outer sole shall be deeply serrated, having resilient ribs and grooves, the end surfaces of the ribs being finished and the ends of the grooves being open, said apparatus being of the kind wherein an independent ring mold embraces the bottom mold and a moldable blank resting on the latter while pressure is applied to the blank thereby to conform the material of the blank to the contour of the upper surface of the bottom mold, the bottom mold comprising a rigid block of a size and peripheral contour to fit within the ring mold and having an upper surface with deeply serrated portions formed by alternating deep ribs and grooves and which is a replica, but in reverse, of the surface of the desired outer sole, said ribs being substantially triangular in front-to-rear vertical cross section with the apex at the surface, and in combination with said block, means for preventing cohesion of moldable material, exuded between said bottom mold and said embracing ring mold, to the ends of the ribs on the outer sole, said means comprising an upstanding thin rim of rigid material extending uninterruptedly about the periphery of the upper face of the block, the inner surface of said rim being finished and closely contacting the ends of the ribs and closing the ends of the channels in the block.

2. A bottom mold according to claim 1, wherein said rim comprises a ring of sheet material fixed within a peripheral rabbet in the upper part of the block and the outer surface of the rim is flush with the peripheral surface of the lower portion of the block.

3. A bottom mold according to claim 1, wherein the rim is of a height and its upper edge is of a contour such as to impart to the sole a peripheral shape simulating that of a welt shoe.

References Cited in the file of this patent
UNITED STATES PATENTS

| | | |
|---|---|---|
| 1,537,684 | Chapelle | May 12, 1925 |
| 1,813,150 | Dunbar | July 7, 1931 |
| 2,168,243 | Rollmann | Aug. 1, 1939 |
| 2,178,086 | Szereny | Oct. 31, 1939 |
| 2,298,227 | Pinkerton et al. | Oct. 6, 1942 |
| 2,460,832 | La Follette | Feb. 8, 1949 |
| 2,651,118 | Root | Sept. 8, 1953 |

FOREIGN PATENTS

| | | |
|---|---|---|
| 76,319 | Netherlands | Nov. 15, 1954 |